SEMICONDUCTOR DEVICE

Original Filed July 13, 1959 3 Sheets-Sheet 1

INVENTORS.
ROBERT W. FRITTS
JAMES D. RICHARDS
BY Carpenter Abbott Coulter & Kinney
ATTORNEYS March 8, 1966 R. W. FRITTS ETAL 3,239,377

SEMICONDUCTOR DEVICE

Original Filed July 13, 1959 3 Sheets-Sheet 2

*INVENTORS.*
ROBERT W. FRITTS
JAMES D. RICHARDS

BY *Carpenter Abbott Coulter & Kinney*
ATTORNEYS

March 8, 1966 R. W. FRITTS ETAL 3,239,377

SEMICONDUCTOR DEVICE

Original Filed July 13, 1959 3 Sheets-Sheet 3

*INVENTORS.*
ROBERT W. FRITTS
JAMES D. RICHARDS

BY Carpenter Abbott Coulter & Kinney
ATTORNEYS

United States Patent Office 3,239,377

Patented Mar. 8, 1966

3,239,377

SEMICONDUCTOR DEVICE

Robert W. Fritts, Arden Hills, and James D. Richards, Roseville, Minn., assignors to Minnesota Mining and Manufacturing Company, St. Paul, Minn., a corporation of Delaware Original application July 13, 1959, Ser. No. 826,597, now Patent No. 3,080,261, dated Mar. 5, 1963. Divided and this application Apr. 19, 1962, Ser. No. 188,762
2 Claims. (Cl. 117—229)

This application is a division of application Serial No. 826,597, filed July 13, 1959, now Patent No. 3,080,261, and entitled "Semiconductor Device and Method of Forming the Same."

Certain semiconductors, such as alloys of lead and tellurium, selenium and sulphur to which suitable doping agents have been added, have substantial utility as thermoelectric generator elements and high positive temperature coefficient resistor elements. Because of the frangible nature of these materials special handling and mounting techniques must be employed in order for such materials to be usable in practical devices. In the past, generator elements and positive temperature coefficient resistor elements have been conveniently made by casting the material in carbon molds in diameters ranging from about 0.10″ to 1.0″. Where elements of smaller cross-section are desired, however, it is difficult, if not impossible, to successfully employ this casting technique. Moreover, as the cross-section of the elements is reduced, the susceptibility to fracture is substantially increased to thereby complicate the handling and mounting problems inherent in the use of such materials.

For thermoelectrically powered systems in which high voltage is desired and high currents are unimportant, it is desirable to provide a thermoelectric generator power source in which the thermoelements thereof take the form of a plurality of thin filaments of alternate P-type and N-type semiconductors, i.e. semiconductors of opposite polarity. In the case of positive temperature coefficient resistors, the attainment of resistance values greater than 0.10 ohm requires that such resistors take the form of thin filaments of semiconductor material having a much smaller diameter than can be provided by conventional casting techniques.

It is the general object of the present invention to provide an improved semiconductor device having one or more semiconductor elements having the configuration of a long thin filament.

Another object of the invention is to provide an improved semiconductor device of the aforementioned character in which the semiconductor element or elements thereof are supported in a novel manner affording the latter substantial fracture resistance.

A more specific object of the invention is to provide an improved semiconductor device of the class described in which the semiconductor element or elements thereof are bonded throughout the length thereof to an insulating ceramic supporting member.

Other and further objects of the invention will become apparent as the description proceeds, reference being had to the drawings accompanying and forming a part of this specification, and in which several forms of the invention are illustrated. In the drawings.

The present invention takes advantage of a discovery that certain semiconductor materials can be firmly bonded to certain ceramic bodies by contacting the surface of said bodies with the semiconductor material under at least partially oxidizing conditions when the semiconductor material is in a melted state. Alloys of lead and tellurium, selenium and sulphur, for example the compositions disclosed in Patents Nos. 2,811,440, 2,811,441, 2,811,570, 2,811,721 and 2,811,720 are among those which bond well to ceramic bodies made, for example, from silicate based ceramics, such as aluminum or magnesium silicates. Specific examples of such ceramic materials are $Al_2O_3 \cdot 4SiO_2 \cdot H_2O$, known by the name pyrophyllite, $2MgO \cdot SiO_2$, known by the name forsterite, and $MgO \cdot SiO_2$, known by the name steatite. It has been observed that when such semiconductor materials in a molten state are placed in contact with such ceramic members under oxidizing conditions, a wetting of the ceramic takes place causing the semiconductor material to fill and cling to the ceramic member within any small cross-section concavities of the ceramic member, even upon removal of the ceramic member from the melt.

It is believed that the wetting of the ceramic by the semiconductor is made possible by the formation of an oxide complex of the semiconductor which is soluble in both the semiconductor and the ceramic. For example, molten lead telluride exposed to a limited supply of oxygen forms a number of oxide complexes such as $PbO\text{-}TeO_2$ and mixtures thereof such as $PbTeO_3$. It is believed that in the case of silicate based ceramic materials such as magnesium silicate, the bonding is afforded through the limited reaction between the oxide of lead and the silica component ($SiO_2$) of the ceramic to form a lead-silicate complex. Lead-silicate is a well-known chemically stable oxide complex. The presence of one mole percent oxygen in lead telluride alloys has been found to be adequate to afford adherence of the oxidized semiconductor within concavities or recesses having cross-sectional radii of curvature of the order of $\frac{1}{64}$ inch. In such concavities or recesses it appears that the surface tension effect combines with the surface wetting tendency of the semiconductor to provide sufficient support to hold the molten semiconductor in the concavities as the hot ceramic body is withdrawn from the molten semiconductor but not sufficient to hold the molten semiconductor to convex or flat surfaces of any substantial area. The present invention takes advantage of this phenomenon to conveniently form as well as to bond filamentary semiconductor elements to ceramic members having elongated concavities or recesses of reduced cross-section formed in a surface thereof.

Figure 1:
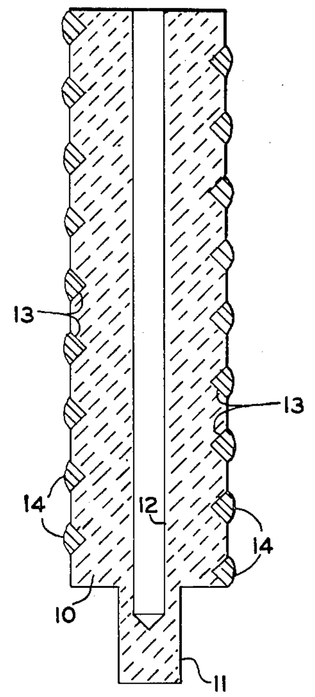
FIGURE 1 is an axial sectional view of a positive temperature coefficient semiconductor resistor structure in an intermediate stage of the manufacture thereof.

FIGURE 1 illustrates one stage in the manufacture of a high positive temperature coefficient resistor constructed in accordance with the present invention. Referring more particularly to FIGURE 1, the numeral 10 indicates a cylindrical insulating ceramic body formed at one end with a coaxial cylindrical projection 11 of reduced diameter and having an axial bore 12 extending from the opposite end into the projection 11 as shown. The periphery of the body 10 is formed with a helical groove 13 of small cross-section which may be V-shaped as shown. As also shown in FIGURE 1, the groove 13 has bonded therein a helical filamentry element 14 of high positive temperature coefficient semiconductor material, for example lead telluride.

The element 14 is conveniently formed and bonded within the groove 13 by dipping the body 10, with the projection 11 lowermost into a melt of selected semiconductor material under oxidizing conditions, and then withdrawing said body from the melt and allowing the semiconductor clinging within the groove 13 to solidify. The necessary oxidizing conditions can be provided in at least two ways. The ceramic part may be dipped into a bath of molten semiconductor under a partial pressure of oxygen, or the ceramic part may be first fired with a thin coating of an oxide of the semiconductor, i.e., $PbTeO_3$ in the case of lead telluride, which will react to form a glaze on the surface of the ceramic. The glazed part is then dipped into a molten semiconductor bath under an atmosphere of inert gas and withdrawn. In either case, sufficient oxygen is available to accomplish the wetting of the ceramic and filling of the groove 13 by the molten semiconductor which becomes firmly bonded to the body 10 within the groove 13 upon solidification.

The body 10 with the semiconductor filament 14 bonded thereto is then hydrogen annealed below the melting point of the semiconductor to remove the effects of surface oxidation upon the electrical properties of the semiconductor. The projection 11 is then cut off, for example on an abrasive saw, and insulating lead wires 15 and 16 are fitted through the bore 12, as shown, and soldered to the opposite ends of the helical semiconductor filament 14, as at 17 and 18 respectively. The entire assembly may then be coated with a suitable insulating material, for example by a dipping process, to afford an insulating coating 19 for the finished resistor.

Figure 3:
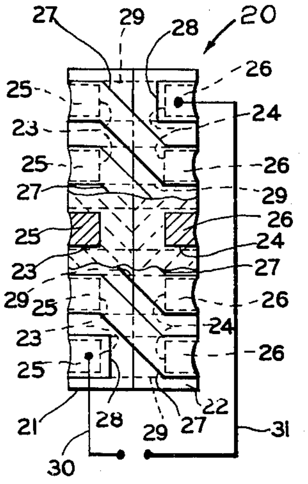
FIGURE 3 is a plan view, partly in section, showing a thermoelectric generator fabricated from a pair of rectangular insulating ceramic supporting structures, one bearing P-type and the other bearing N-type filamentary semiconductor thermoelements.

FIGURE 3 shows another embodiment of the invention taking the form of a thermopile structure 20. The thermopile 20 comprises a pair of similar rectangular elongated electrically and thermally insulating ceramic supporting members 21 and 22 which are shown in end view in FIGURE 3 and are formed with spaced parallel longitudinally extending grooves or recesses 23 and 24, respectively, extending the full length thereof. The grooves or recesses 23 accommodate elongated filamentary P-type semiconductor thermoelements 25 bonded therein to the member 21, and the grooves or recesses 24 similarly accommodate elongated filamentary N-type semiconductor thermoelements 26 bonded therein to the member 22 as shown. Alternate P-type and N-type thermoelements 25 and 26 are connected in series circuit by suitable contact means forming hot and cold thermojunctions for the thermopile 20. Where the thermoelements 25 and 26 are formed of P-type and N-type lead telluride compositions respectively, junction electrodes of a metal such as iron or tin are satisfactory. In FIGURE 3 cold junction electrodes 27 are shown connecting alternate P- and N-type thermoelements, and electrodes 28 function as terminal and cold thermojunction members for the thermopile 20. At the hot juncton end of the thermopile 20, thermojunction members 29 are shown in dotted lines as connecting adjacent P-type and N-type thermoelements to complete the series circuit connection of alternate P- and N-type thermoelements. Suitable conductors 30 and 31 may be provided for connection of the terminal electrodes 28 to an external circuit or load.

Figure 2:
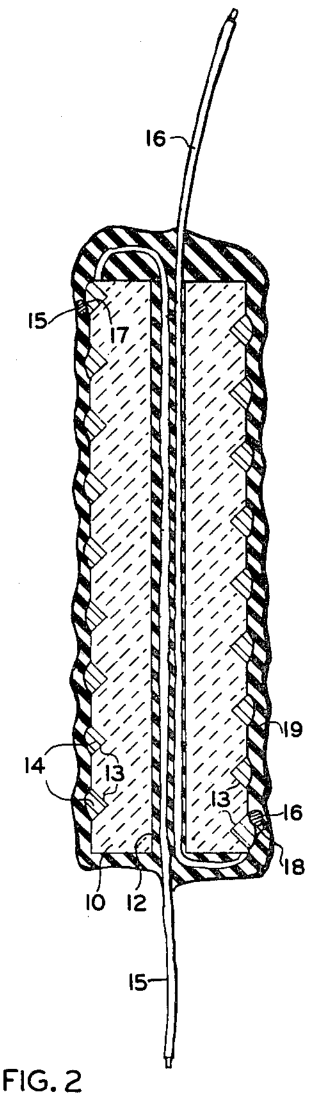
FIGURE 2 is a view similar to FIGURE 1 showing the positive temperature coefficient semiconductor resistor of FIGURE 1 in its finished form.

In the formation of the thermopile 20, the filamentary semiconductor thermoelements 25 may be formed in the recesses or grooves 23 and bonded therein to the ceramic member 21 by dipping the member 21 in a melt of selected P-type semiconductor and withdrawing the same under oxidizing conditions in substantially the same manner described in connection with the formation of the helical semiconductor resistor element shown in FIGURES 1 and 2. The filamentary thermoelements 26 may be formed in the grooves or recesses 24 and bonded therein to the member 22 by similarly dipping the member 22 into a melt of selected N-type semiconductor material and withdrawing the same under oxidizing conditions as previously set forth. The ceramic supporting members 21 and 22, with the thermoelements 25 and 26 bonded thereto, are then hydrogen annealed below the melting point of said thermoelements to remove the effects of surface oxidizing upon the electrical characteristics of said thermoelements. The thermojunction electrodes 27, 28 and 29 may be formed and bonded to the ends of the thermoelements and of the ceramic members 21 and 22 by masking the surfaces to be left uncoated and metal spraying the remaining portions by well-known techniques, for example those employed in printed circuitry.

Figure 4:
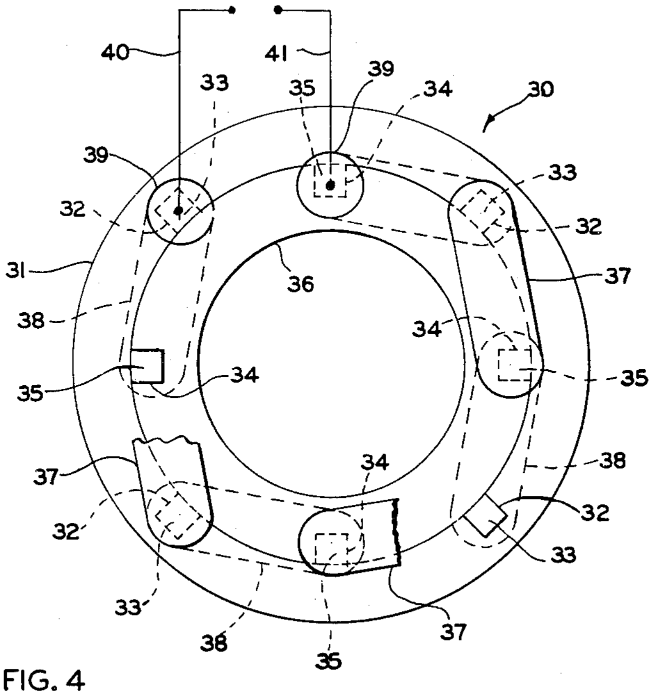
FIGURE 4 is a plan view, with parts broken away, of a tubular thermoelectric generator structure fabricated from a pair of concentric insulating ceramic sleeves, one bearing P-type and the other bearing N-type filamentary semiconductor thermoelements.

FIGURE 4 illustrates a tubular thermopile structure 30 which may be formed by techniques similar to those employed in forming the thermopile 20 of FIGURE 3. In FIGURE 4 one end of an elongated cylindrical outer sleeve 31 of electrically and thermally insulating ceramic material is shown as formed on its inner surface with spaced axially extending recesses or grooves 32 extending the full length thereof. Bonded to the sleeve 31 within the grooves or recesses 32 are elongated filamentary thermoelements 33 of N-type semiconductor material. Fitted within the outer sleeve 31 is an elongated cylindrical inner sleeve 36 of even length having its outer surface formed with spaced axially extending recesses or grooves 34 extending the full length thereof and offset from the grooves or recesses 32 of the sleeve 31. Bonded to the sleeve 36 within the grooves or recesses 34 are elongated filamentary P-type thermoelements 35. The thermoelements 33 and 35 extend the full length of the sleeves 31 and 36.

The thermoelements 33 and 35 are connected in series circuit relation by cold thermojunction electrodes 37 at one end, and by hot themojunction electrodes 38 at the other end, the latter electrodes being shown in dotted lines. Terminal and cold thermojunction electrodes 39 permit connection of the thermopile 30 to an external circuit or load as by means of suitable conductors 40 and 41.

In forming the thermoelements 33 and 35, the sleeves 31 and 36 are respectively dipped in selected N-type and P-type semiconductor melts in the manner aforedescribed, and are then annealed. The sleeve 36 is then fitted within the sleeve 31 as shown, and the thermojunction electrodes 37, 38 and 39 are bonded to the ends of the thermoelements 33 and 35 as well as to the ends of the sleeves 31 and 36, for example by the spray metal technique aforementioned.

Figure 5:
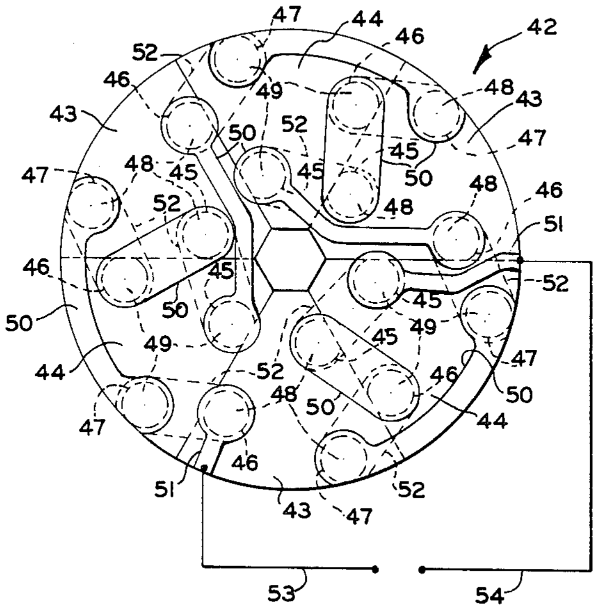
FIGURE 5 is a plan view of a thermoelectric generator fabricated from a plurality of insulating ceramic segments each bearing a plurality of filamentary semiconductor thermoelements of the same type, the thermoelements of adjacent segments being of opposite conductivity type.

FIGURE 5 illustrates another form of the invention in which a cylindrical thermopile 42 is fabricated from a plurality of generally wedge shaped segments or sectors, there being six such sectors in the illustrated form of the invention. In FIGURE 5 electrically and thermally insulating ceramic wedge shaped sectors or segments 43 are alternated with substantially identical segments 44. The illustrated segments 43 and 44 are each formed in the radial surfaces thereof with axially extending grooves or recesses 45 and 46 and are formed on the circumferential surface thereof with an axially extending groove or recess 47. In the formation of the thermopile 42 the sectors 43 and 44 are respectively dipped in molten P-type and N-type semiconductor material as aforedescribed to form and bond filamentary P-type and N-type thermoelements 48 and 49 in the grooves or recesses 45, 46 and 47 of the sectors 43 and 44. After annealing as aforedescribed, the sectors 43 and 44 are interfitted as shown to form a composite cylindrical structure, and the thermoelements 48 and 49 are connected in series circuit by bonding thereto at one end the cold thermojunction electrodes 50 and terminal and cold thermojunction electrodes 51. At the opposite end of the thermopile structure 42 the ends of the thermoelements 48 and 49 are connected as indicated by hot thermojunction electrodes 52 shown in dotted lines. Suitable conductors 53 and 54 may be provided for connecting the terminal electrodes 51 to an external circuit or load. The thermojunction electrodes 50, 51 and 52 may be bonded to the ends of the filamentary thermoelements 48 and 49 as well as to the ends of the insulating segments 43 and 44 by the spray metal techniques aforedescribed.

Figure 6:
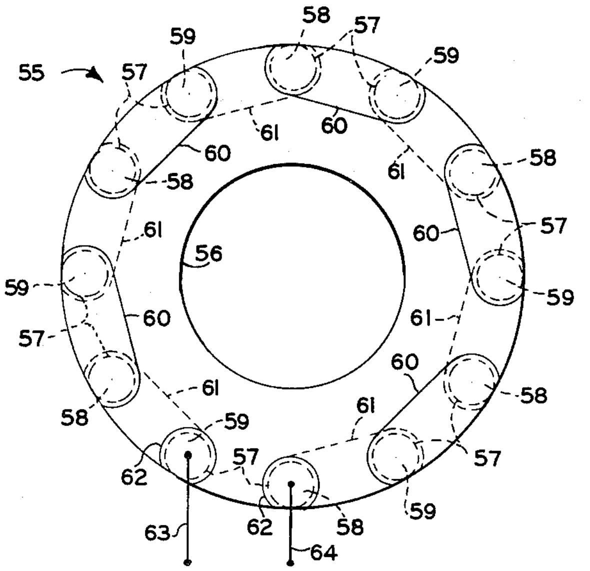
FIGURE 6 is a plan view of another form of a tubular thermoelectric generator structure.

As distinguished from the thermopile structures shown in FIGURES 3, 4 and 5, in which adjacent segments of a composite structure bear thermoelements of material of opposite electrical conductivity, FIGURE 6 illustrates a thermopile structure 55 in which a unitary tubular core 56 of electrically and thermally insulating ceramic material carries alternate filamentary P-type and N-type semiconductor thermoelements. The core 56 is formed with spaced axially extending peripheral recesses or grooves 57, and bonded to the core 56 within the grooves 57 are alternate filamentary P-type and N-type thermoelements 58 and 59.

The structure of the thermopile 55 is fabricated by first forming filaments or rods of P-type and N-type semiconductor material respectively, said rods or filaments having somewhat smaller cross-section than the recesses or grooves 57. The rods or filaments of P-type and N-type semiconductor are then inserted into the appropriate grooves 57, and the core 56 is then enclosed in a suitable retainer means, for example a close fitting mica tube, to prevent the escape of the semiconductor from the grooves or recesses 57 upon melting. The entire structure is then heated to above the melting point of the semiconductor under slightly oxidizing conditions as aforedescribed to form the thermoelements 58 and 59 and bond the same to the core 56 within the grooves or recesses 57. After solidification of the thermoelements 58 and 59, the structure is subjected to a hydrogen anneal as aforedescribed, after which said thermoelements are connected in series circuit by cold thermojunction electrodes 60 at one end and hot thermojunction electrodes 61 at the opposite end. Terminal and cold thermojunction electrodes 62 permit connection of the thermopile 55 to an external circuit or load as by conductors 63 and 64.

The invention provides structures in which inherently fragile semiconductor filaments are supported throughout their length by virtue of their being bonded to a ceramic supporting member. With these structures the use of filamentary resistor and thermoelectric elements becomes practical, since such structures afford sufficient resistance to fracture of the semiconductor element to withstand all normal handling. In order to minimize the effect of thermal expansion and contraction, it is preferred to use an insulating ceramic supporting member or members having a thermal expansion coefficient substantially matching that of the semiconductor element or elements bonded thereto.

Having thus described several specifically illustrated embodiments of the present invention, it is to be understood that the illustrated forms are selected to facilitate the disclosure of the invention, rather than to limit the number of forms which it may assume. Various modifications, adaptations and alterations may be applied to the specific forms shown to meet the requirements of practice, without in any manner departing from the spirit or scope of the present invention, and all of such modifications, adaptations and alterations are contemplated as may come within the scope of the appended claims.

What is claimed as the invention is:

1. A semiconductor device comprising a silicate based electrically insulating ceramic supporting member, and a lead based semiconductor element bonded by a lead-silicate complex directly to said supporting member.

2. A semiconductor device comprising a silicate based electrically insulating ceramic supporting member, and a semiconductor element formed of an alloy of lead and at least one of the group consisting of tellurium, selenium and sulfur bonded by a lead-silicate complex directly to said supporting member.

References Cited by the Examiner

UNITED STATES PATENTS

| | | | |
|---|---|---|---|
| 2,071,495 | 1/1936 | Hanlien | 117—212 |
| 2,374,701 | 5/1945 | Ray | 136—4.13 |
| 2,416,864 | 3/1947 | Bricker | 117—215 |
| 2,674,641 | 4/1954 | Holmes | 136—5.2 |
| 2,811,569 | 10/1957 | Fredrick et al. | 136—5 |
| 2,861,014 | 11/1958 | Sheheen et al. | 117—219 |
| 3,006,978 | 10/1961 | McGrath et al. | 136—4 |
| 3,017,445 | 1/1962 | Fritts | 136—4.13 |
| 3,088,988 | 5/1963 | Menke | 136—4 |

FOREIGN PATENTS

| | | |
|---|---|---|
| 24,968 | 11/1900 | Great Britain. |

WINSTON A. DOUGLAS, *Primary Examiner.*

JOHN H. MACK, *Examiner.*